United States Patent
Montesinos

(10) Patent No.: US 7,628,017 B2
(45) Date of Patent: Dec. 8, 2009

(54) PRODUCTION OF HYDROGEN USING LOW-ENERGY SOLAR ENERGY

(76) Inventor: Philippe Montesinos, 10 Route de Langlade, Bernis (FR) 30620

( * ) Notice: Subject to any disclaimer, the term of this patent is extended or adjusted under 35 U.S.C. 154(b) by 317 days.

(21) Appl. No.: 11/661,978

(22) PCT Filed: Jul. 18, 2005

(86) PCT No.: PCT/FR2005/001847

§ 371 (c)(1),
(2), (4) Date: Mar. 6, 2007

(87) PCT Pub. No.: WO2006/027438

PCT Pub. Date: Mar. 16, 2006

(65) Prior Publication Data

US 2008/0041054 A1    Feb. 21, 2008

(30) Foreign Application Priority Data

Sep. 7, 2004    (FR)    ................... 04 09492

(51) Int. Cl.
*B60K 16/00* (2006.01)
(52) U.S. Cl. .................... 60/641.8; 60/641.15
(58) Field of Classification Search .... 60/641.8–641.15
See application file for complete search history.

(56) References Cited

U.S. PATENT DOCUMENTS

| | | | |
|---|---|---|---|
| 3,070,703 A | * | 12/1962 | Podolny .................. 290/2 |
| 4,246,080 A | | 1/1981 | Shinn et al. |
| 4,354,117 A | * | 10/1982 | Abernathy ................. 290/1 R |
| 4,408,459 A | | 10/1983 | Yogev |
| 5,775,107 A | * | 7/1998 | Sparkman .................. 60/641.8 |
| 5,924,287 A | | 7/1999 | Best et al. |
| 6,434,942 B1 | * | 8/2002 | Charlton .................. 60/641.11 |

FOREIGN PATENT DOCUMENTS

| | | |
|---|---|---|
| CH | 672 368 | 11/1989 |
| DE | 28 44 011 | 4/1980 |
| DE | 29 27 388 | 1/1981 |
| DE | 38 34 703 | 4/1990 |
| DE | 42 43 401 | 6/1994 |
| DE | 101 05 350 | 10/2002 |
| EP | 672368 | 11/1989 |
| FR | 2 317 523 | 2/1977 |
| FR | 2317523 | 2/1977 |
| FR | 2 551 802 | 3/1985 |
| FR | 2551802 | 3/1985 |

* cited by examiner

*Primary Examiner*—Hoang M Nguyen
(74) *Attorney, Agent, or Firm*—Young & Thompson

(57) ABSTRACT

The invention relates to a device for production of hydrogen, using low-energy solar energy, by means of solar traps (1) to give hot water (3) during the day and thermal radiators (2) to give cold water (4) during the night. The hot and cold water are stored to give a permanent hot (3) and cold (4) source which produce electricity by using a turbine (6) operating with the Rankine cycle coupled to an alternator (18), or a Stirling engine, or by a thermoelectric process. Said electricity may be used for electrolysis (9) of water (10) to give hydrogen (11).

18 Claims, 5 Drawing Sheets

PRODUCTION OF HYDROGEN USING LOW-ENERGY SOLAR ENERGY

BACKGROUND OF THE INVENTION

1. Field of the Invention

This invention concerns a device which produces hydrogen through low solar energy.

2. Description of the Related Art

Usually, electricity produced by solar energy may be generated by one of two ways:

with photocells, it is easy, but expensive, or with high energy; for example, water is turned into steam with solar concentrators (this is the warm source), this steam drives a turbine, the surrounding air being the colder source. This is very complex and very expensive.

If we want to use as low-energy warm source warm water which is not in the form of steam, the surrounding air is not a good cold source.

BRIEF SUMMARY OF THE INVENTION

The device according to the invention helps solve these inconveniences. The first solution is to obtain cold water at nighttime using thermal energy dissipators. The second solution is to store hot water obtained in the daytime and cold water obtained at nighttime allowing the two thermal sources to be permanently available to drive a turbine in a Rankine cycle, coupled with an alternator, or drive a Stirling engine, or by thermoelectricity.

The day/night alternation is usually a handicap for solar energy, but in this invention we make it a major advantage.

The electricity produced can then be used to produce hydrogen. Hydrogen is then transported by gas pipelines or stored under pressure in reservoirs.

This hydrogen is used as non-polluting combustible or for automobiles (with fuel cells) or for non-polluting electricity production in power plants.

BRIEF DESCRIPTION OF THE DRAWING FIGURES

Other characteristics and advantages of the invention will be readily evident by referring to the following description given only as example not limited in which.

DETAILED DESCRIPTION OF THE INVENTION

Figure 1:
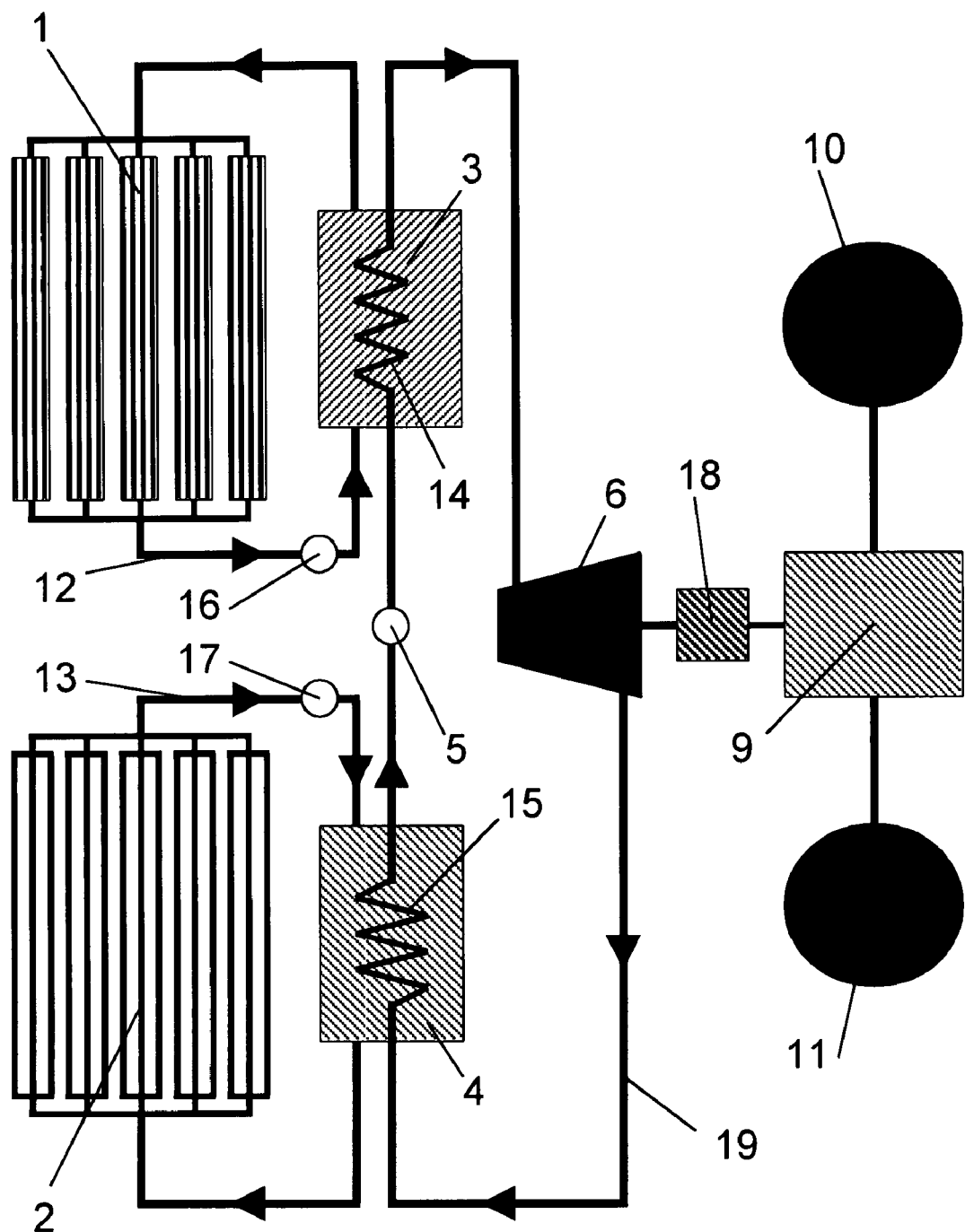
FIG. 1 is a schematic view of the electricity producing device with a turbine in a Rankine cycle, coupled to an alternator, associated to an electrolytic cell producing hydrogen.

FIG. 1 shows the device for electricity production with a turbine in a Rankine cycle, coupled with an alternator, associated with an electrolytic cell producing hydrogen.

In the daytime, water circulates inside the flat solar collectors (1), the water temperature is elevated because the solar heat is trapped inside by a greenhouse effect. Water is pumped by a pump (16) into a circuit (12) and is stored in a reservoir (3). The water circulates again in the solar collectors (1), this cycle lasts all day in order to have the stored water (3) at the highest temperature possible. This device is turned off overnight.

At nighttime water circulates inside the thermal dissipators (2), the water temperature lowers because the heat is dissipated through conduction, convection and radiation. Water is pumped by a pump (17) into a circuit (13) and it is stored in a reservoir (4). The water circulates again in the thermal dissipators (2), this cycle lasts all night in order to have the stored water (4) at the lowest temperature possible. In the daytime, this device is turned off.

Having a warm thermal source (3) and a cold thermal source (4) permanently available, it is possible to transform thermal energy into mechanical energy using the principles of Carnot.

We use a Rankine cycle. For this, we use a second circuit (19) a closed circuit in which circulates a refrigerant working fluid, for example ammonia (or alkenes, HCFC, "Freon", propylene, isobutane, isopentane or other) that changes phase (liquid/gas) and pressure during the cycle.

The working fluid is evaporated in a coil (14) (evaporator) which is immersed in the stored warm water (3), it takes heat from the warm source (3), the produced steam drives a low pressure turbine (6) as it expands, the steam condenses in a coil (15) (condenser) which is immersed in the stored cold water (4), it gives off heat to the cold source (4), a pump (5) allows the working fluid to circulate from the cold source (4) to the warm source (3) the fluid is again put under pressure. A new cycle begins.

Stored warm water (3) is cooled by removing of the working fluid and must then be reheated by the solar collectors (1) during the daytime. The cold water (4) that is stored is heated by supplies of the working fluid and must then be cooled by the thermal dissipators (2) during the nighttime.

The turbine (6) drives an alternator (18) that produces electricity.

One great interest is to use this electricity to produce hydrogen through water electrolysis. An electrolytic cell (9) uses electricity produced by the alternator (18) to realize the electrolysis of water coming from a reservoir (10), the hydrogen that is produced is stored in a reservoir (11).

If electricity is produced in isolated areas, it is a very good use to realize water electrolysis in order to obtain hydrogen, which can be used later as non-polluting fuel.

This device is particularly ecological at every level and is one of the best alternatives to fossil energies. Oil and all fossil energies are very polluting and soon there will be a shortage of these energies. Hydrogen is a non-polluting fuel, in order to compete with the oil industry it must be produced from a renewable energy and at a low cost.

It is preferable that the production be done in arid, semi-arid, desert or semi-desert areas, near tropics, because:

the temperature difference between day and night is greater in these areas, there is a strong solar heat, there are few clouds, the hygrometry is very low so the sun's rays are more intense, at nighttime the sky is very clear, allowing a good cooling by radiation of the thermal dissipators, the closer we are to the equator, the faster the day/night transition, and there are less variations between seasons, we can use large unpopulated areas which are not used by agriculture.

The economical aspect:

In order for this device to be really competitive with the production of electricity produced by nuclear energy or with fossil energies (oil, gas, coal), the cost of building and exploiting power plants using this device must be as low as possible.

We will explain in more detail the less expensive ways to produce a kWh at the lowest price, and being robust enough in order to be adapted to harsh climates.

One of the cheapest and most effective heat carrier fluid is water; all the while being a heat carrier fluid inside solar collectors (1), a heat carrier fluid inside thermal dissipators (2) and for stocking the warm thermal energy (3) and cold thermal energy (4). Water has a great capacity to store thermal energy. Water is brought when the device is installed, the device functions in a closed circuit, therefore no water needs to be added later.

A water supply will be needed only for the production of hydrogen through water electrolysis. If the water is not of good quality, solar distillers may be used to improve the quality (by removing limestone, etc.) in order to avoid sediment deposits causing damage to the device.

Glycol or ethylene-glycol can be added to the water to avoid freezing. Other heat carrier fluids with higher performances can be used, depending on the different climates.

We will describe a simple and very low cost way to realize an effective storage of warm water and cold water in desert areas, without having to transport a lot of material. This device is known by the prior art and is given as an example.

Figure 6:
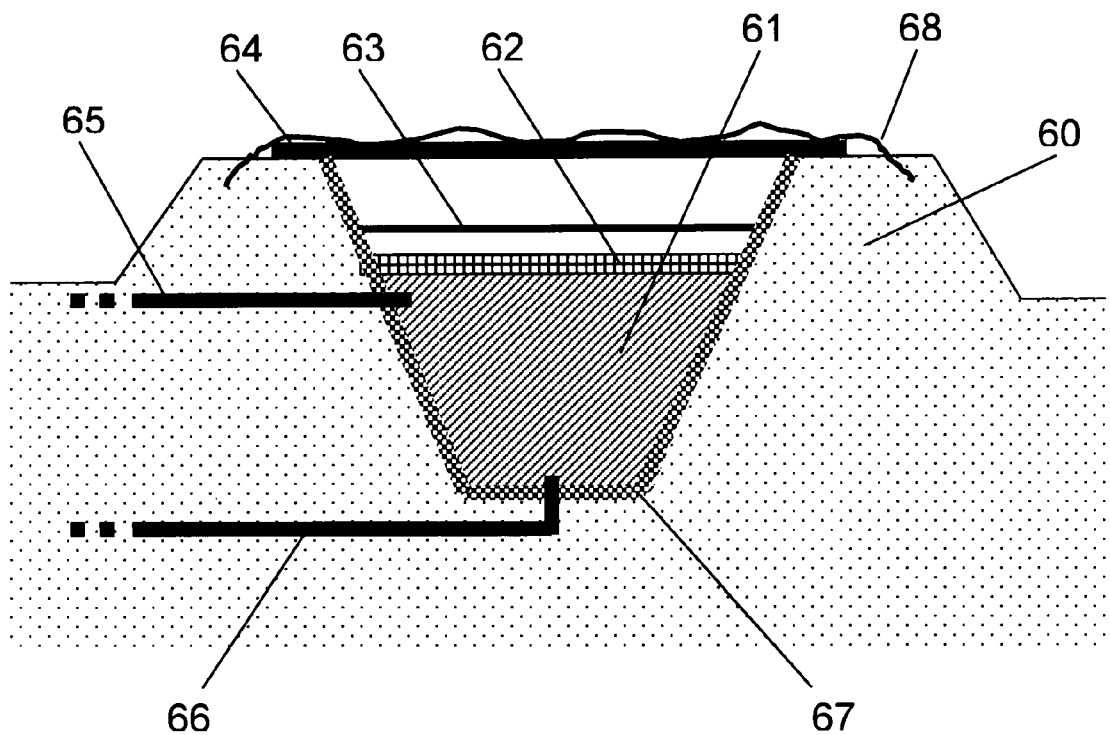
FIG. 6 is a sectional view of a stocking water device.

It is drawn in FIG. 6 a water reservoir. In order to store warm water and cold water it is preferable to dig V shaped reservoirs in the soil, several meters deep. The reservoir walls are covered with water proof and resistant plastic film (67).

Underground storage is efficacious from a thermal point of view and very low cost, the soil being a good natural insulator. Thermal insulation is much better than open-air reservoirs. Sheets of light insulation (62) (for example polystyrene) are placed at the surface of the reservoir to ensure thermal insulation above.

A plastic film (63) prevents the evaporation of water (61). Pipes (65) and (66) allow to water to be pumped in and out. A grid (64) covered with a plastic sheet (68) closes the reservoir thus avoiding dust from falling into the reservoir.

The larger the difference in temperature between warm source (3) and cold source (4), the more power is available to drive the turbine (6). The volume of stored warm water (3) and stored cold water (4) must be as great as possible in order for the performance not to be diminished at the end of each semi-cycle (end of day, end of night), at nighttime the warm water (3) becomes less and less warm, and in the daytime cold water (4) becomes less and less cold, because of the different thermal transfers made by the working fluid and by the inevitable thermal losses of the storage reservoirs. So, the warm and cold temperatures remain as constant as possible.

Warm water having a lower density than cold water, the temperature is higher near the top of the storage reservoirs than at the bottom. The evaporator (14) is then placed at the top of the warm reservoir (3) and the condenser (15) is placed at the bottom of the cold reservoir (4). We obtain a supplementary difference of temperature by having the deepest possible reservoirs in order to get the greatest benefit of this phenomenon.

We gain a small supplementary difference of temperature by making a cold pit in the cold reservoir (4), it is a more deep place where the coldest water is kept by gravity.

In the daytime, the water to be heated is pumped to the bottom of the warm reservoir (3) and once heated by the solar collectors (1), it is brought to the top of the warm reservoir (3).

During the nighttime, the water to be cooled is pumped to the top of the cold reservoir (4) and once cooled by the thermal dissipators (2) it is brought to the bottom of the cold reservoir (4).

Figure 4:
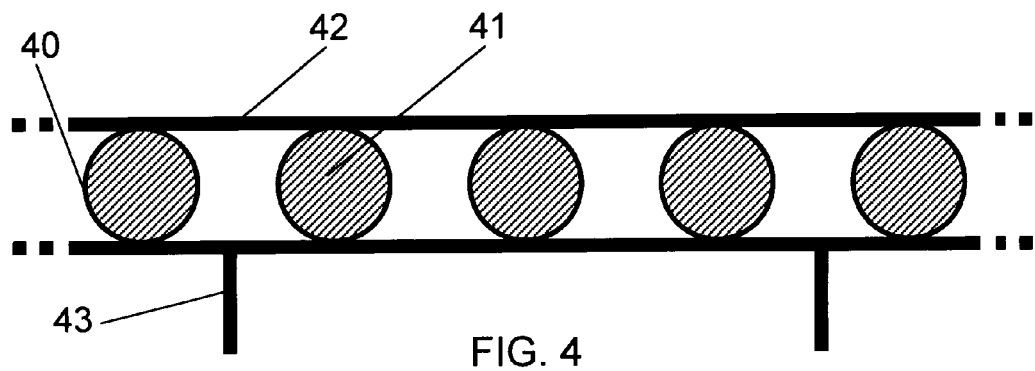
FIG. 4 is a sectional view of a thermal dissipator.
Figure 5:
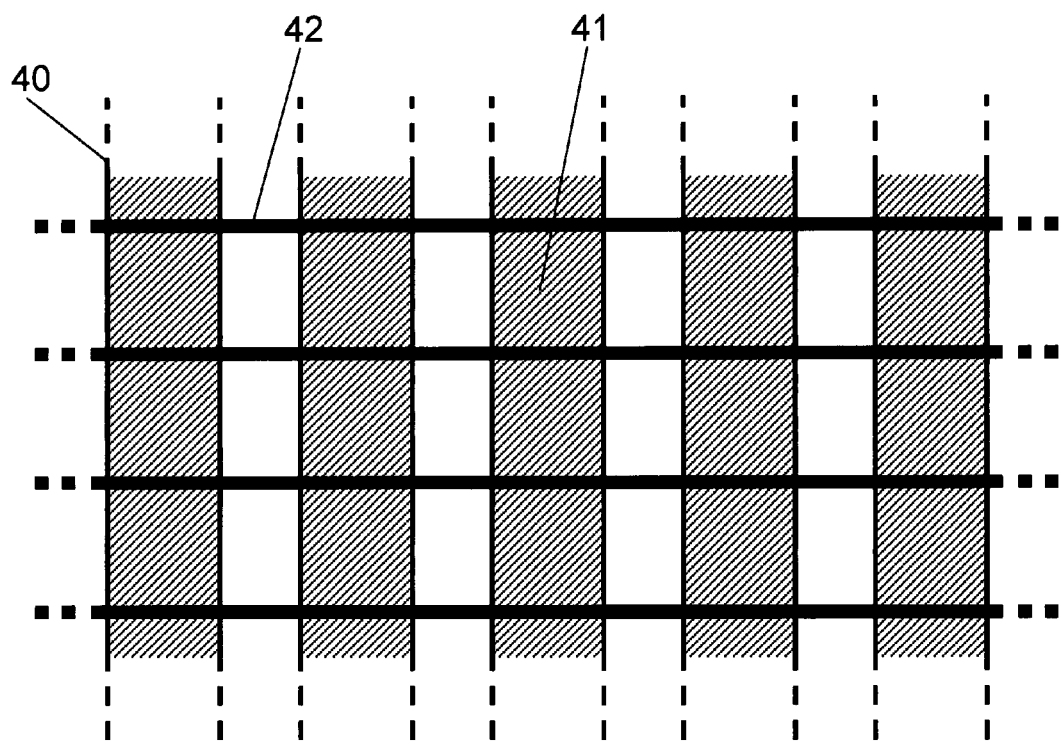
FIG. 5 is a sectional view of a thermal dissipator.

FIG. 4 and FIG. 5 show a schematic view of simple thermal dissipators, as an example, this device is known by the prior art, and it is similar to dissipators found at the rear of refrigerators.

Thermal dissipators (2) are for example made up of metallic tubes (40) in which circulates the heat carrier fluid. These metallic tubes (40) may be constructed from copper, which is a very good thermal conductor. Shanks (42) made from the same metal are welded to the tubes (40) above and below, giving a rigidity to the ensemble and increasing the cooling.

Thermal dissipators are painted in black, because this color allows the best thermal dissipation by radiation. Feet (43) raise the dissipators from the ground and facilitate the convection.

We can use rudimentary flat solar collectors, the use of arid areas where we can dispose of large surfaces for collecting with an intense radiation allows us to have collectors which are not very sophisticated and low cost, because we can be satisfied with low efficiency.

Figure 7:
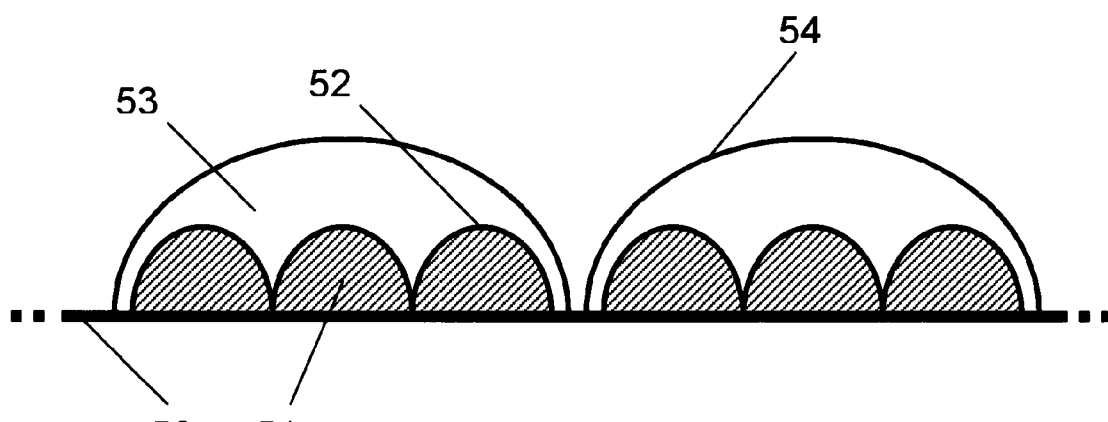
FIG. 7 is a sectional view of a flat solar collector that can become a thermal dissipator.

FIG. 7 shows a schematic view of a simple and low cost flat collector, having the particularity of being able to serve as thermal dissipator at nighttime.

This kind of collector is known by the prior art in his collector function; on the other hand, to inflate the part which assures the greenhouse effect in the daytime and to deflate this part at nighttime in order to transform the collector into a thermal dissipator is not included in the prior art.

A black plastic film (50) serves as the base, another black plastic film (52) is welded to it in order to create channels in which circulate the heat carrier liquid (51). Another transparent plastic sheet (54) is welded to create a volume (53) that can be inflated and deflated. The solar light passes through this transparent sheet and is transformed into infrared rays when it reaches the black surface (52).

The plastic used must have a good opacity to infrared rays in order to generate a greenhouse effect. When this device is used in thermal dissipation mode, it is not as effective as metallic dissipators, therefore, we use this device before using metallic dissipators.

Figure 2:
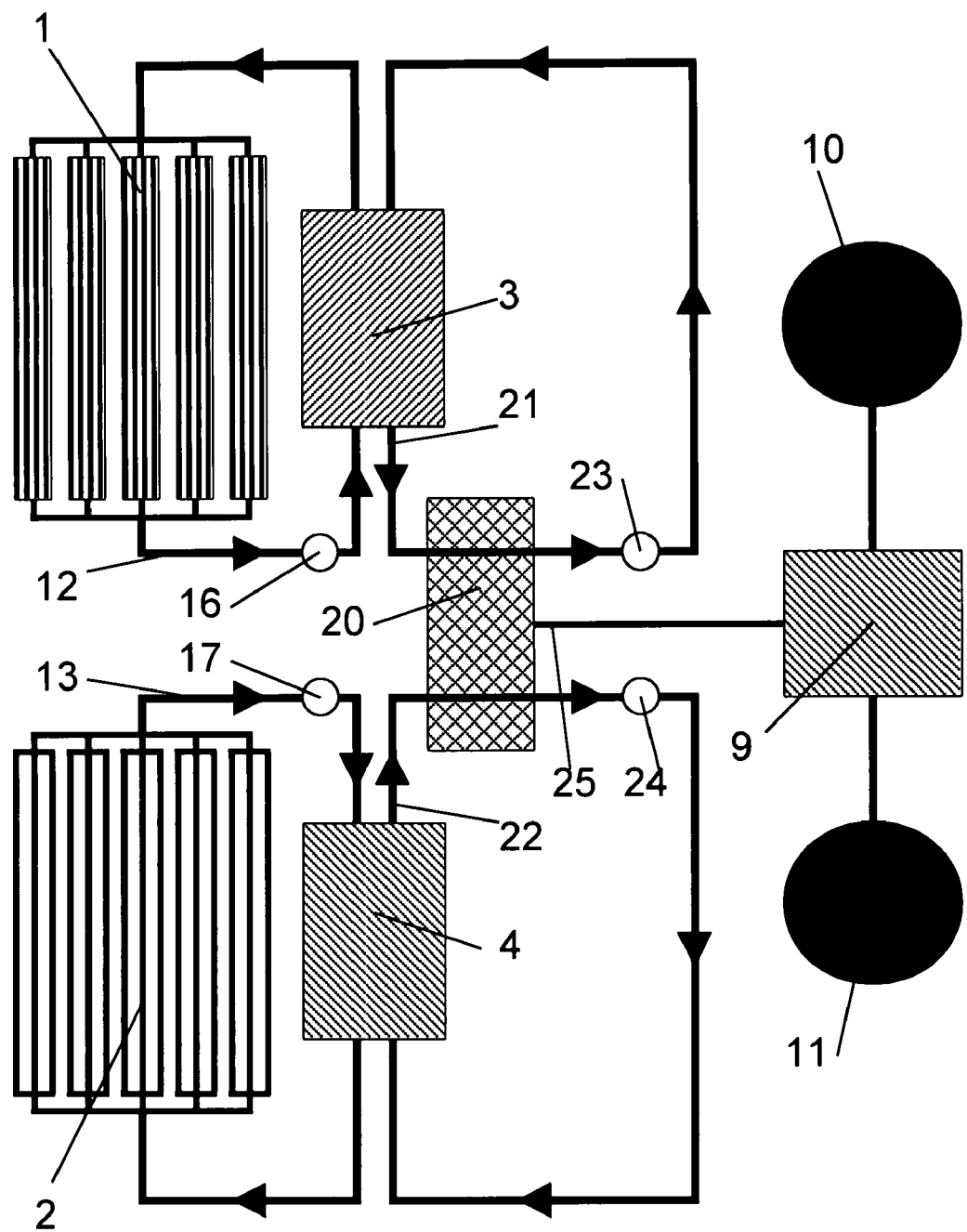
FIG. 2 is a schematic view of the electricity producing device with a thermoelectric process, associated with an electrolytic cell producing hydrogen.

FIG. 2 shows a schematic view of the electricity producing device with a thermoelectric couple, associated with an electrolytic cell producing hydrogen. Its functioning differs from the device with a turbine in a Rankine cycle with an alternator by using a thermo-electric generator (20).

Thermoelectricity or the "Seebeck-Peltier Effect" is the following physical phenomenon: when we subject two appropriate metals welded together to a difference of temperature, an electrical current power is produced.

Thermoelectricity has rarely been used until now. Recent progress linked to the use of semi-conductors in thin layers, make this an interesting way of generating low energy electricity.

In the case of using a thermoelectric generator (20), we use the warm and cold sources directly, without using an intermediate working fluid. Warm water stored in the reservoir (3) is pumped by a pump (23) into a circuit (21) which supplies the thermoelectric generator with heat, cold water stored in the reservoir (4) is pumped by a pump (24) into a circuit (22) which supplies the thermoelectric generator with cold source.

Figure 3:
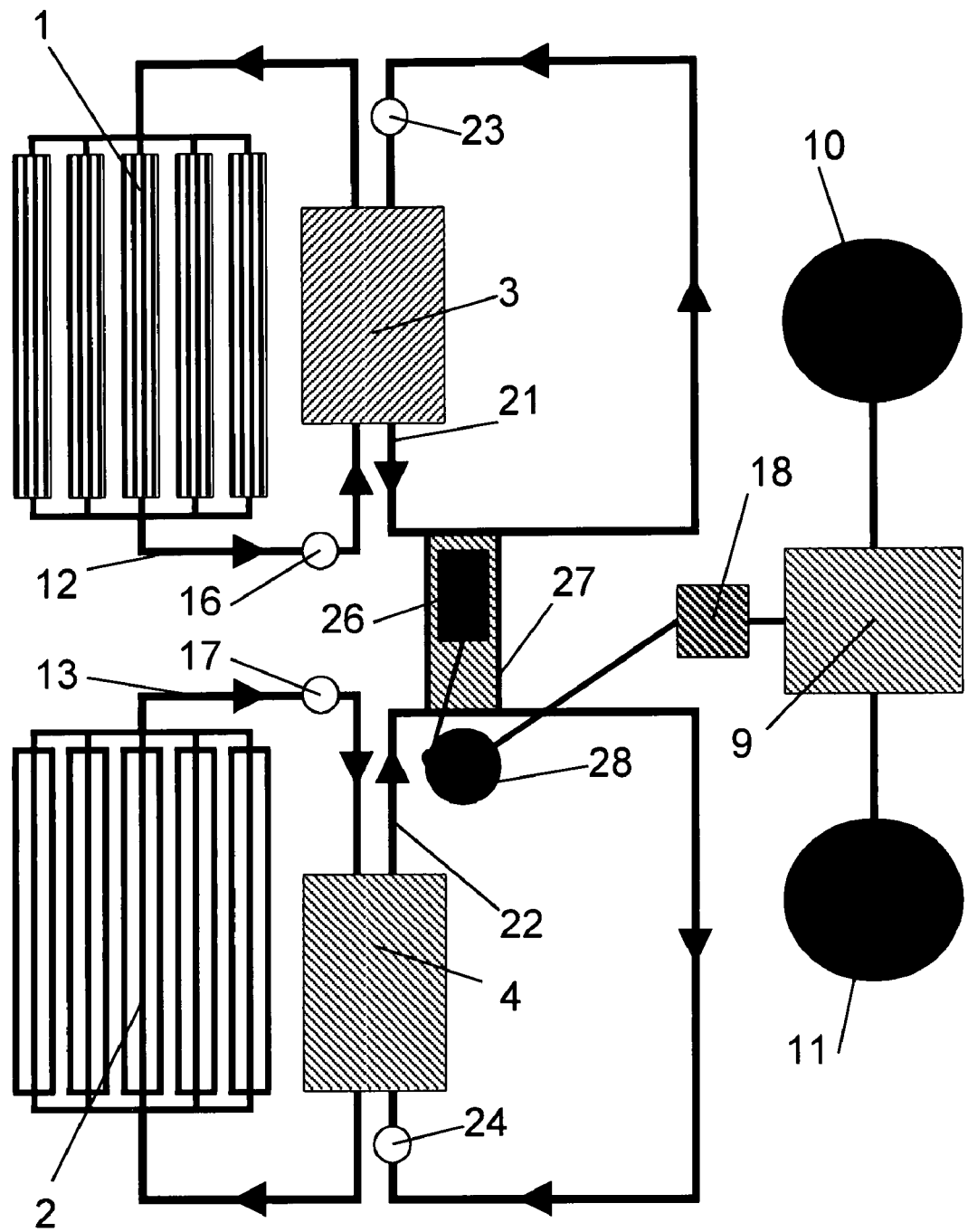
FIG. 3 is a schematic view of the electricity producing device with a Stirling engine coupled to an alternator, associated with an electrolytic cell producing hydrogen.

FIG. 3 shows a schematic view of the electricity producing device with a Stirling engine coupled to an alternator, associated with an electrolytic cell producing hydrogen. A Stirling engine can be used instead of a classic Rankine cycle.

A Stirling engine uses a gas enclosed in an assembling piston (26) cylinder (27). This gas is put alternately in contact with the warm source which gives heat to the gas and with the cold source which takes heat to the gas. When the gas is put in contact with the warm source, its pressure increases and pushes the driving piston (26), then it is put in contact with the cold source, its pressure lowers, the driving piston (26) compresses the gas and the cycle can repeat itself.

The piston is coupled to a fly wheel (28). There are different types of Stirling engines, these engines are known by the prior art.

Thermoelectricity as well as Stirling engines are two ways in which we can use the basis of this invention; nevertheless, from an economical point of view, in the actual technical state, it is preferable to use a turbine in a Rankine cycle.

The invention claimed is:

1. A device for the production of hydrogen in desert or arid areas by means of solar energy comprising:
    solar collectors which produce a warm fluid in the daytime by means of solar energy;
    a reservoir where said warm fluid is stored, said stored warm fluid being a permanent warm thermal source;
    a first closed circuit which allows the circulation of said warm fluid in the daytime between said solar collectors and the reservoir containing the stored warm fluid, said closed circuit of warm fluid contains a pump; thermal dissipators which produce a cold fluid at nighttime;
    a reservoir where said cold fluid is stored, said stored cold fluid being a permanent cold thermal source;
    a second closed circuit which contains a working fluid which is used according to a Rankine cycle;
    a third closed circuit which allows the circulation of said cold fluid at nighttime between said thermal dissipators and said reservoir containing the stored cold fluid, said third closed circuit of cold fluid contains a pump;
    an evaporator in which said working fluid is evaporated using said warm thermal source, said evaporator being placed inside the warm fluid reservoir;
    a turbine driven by the expansion of the evaporated working fluid;
    a condenser in which said working fluid is then condensed using said cold thermal source, said condenser being placed inside the cold fluid reservoir;
    a pump which allows the circulation of said working fluid between said condenser and said evaporator;
    an alternator coupled to said turbine, said alternator producing electricity;
    an electrolytic cell which uses the electricity produced by said alternator to realize the electrolysis of water in order to produce hydrogen.

2. A device for the production of hydrogen in desert or arid areas by means of solar energy comprising:
    solar collectors which produce warm fluid in the daytime by means of solar energy;
    a reservoir where said warm fluid is stored, said stored warm fluid being a permanent warm thermal source;
    a closed circuit which allows the circulation of said warm fluid in the daytime between said solar collectors and the reservoir containing the stored warm fluid, said closed circuit of warm fluid contains a pump;
    thermal dissipators which produce a cold fluid at nighttime;
    a reservoir where said cold fluid is stored, said stored cold fluid being a permanent cold thermal source;
    a closed circuit which allows the circulation of said cold fluid at nighttime between said thermal dissipators and said reservoir containing the stored cold fluid, said closed circuit of cold fluid contains a pump;
    a Stirling engine using said warm thermal source and said cold thermal source to produce mechanical energy; an alternator which produces electricity, said Stirling engine being coupled to said alternator;
    an electrolytic cell which uses the electricity produced by said alternator to realize the electrolysis of water in order to produce hydrogen.

3. A device for the production of hydrogen in desert or arid areas by means of solar energy comprising:
    solar collectors which produce a warm fluid in the daytime by means of solar energy;
    a reservoir where said warm fluid is stored, said stored warm fluid being a permanent warm thermal source;
    a closed circuit which allows the circulation of said warm fluid in the daytime between said solar collectors and the reservoir containing the stored warm fluid, said closed circuit of warm fluid contains a pump;
    thermal dissipators which produce a cold fluid at nighttime;
    a reservoir where said cold fluid is stored, said stored cold fluid being a permanent cold thermal source;
    a closed circuit which allows the circulation of said cold fluid at nighttime between said thermal dissipators and said reservoir containing the stored cold fluid, said closed circuit of cold fluid contains a pump;
    an electrolytic cell which realizes the electrolysis of water in order to produce hydrogen;
    a thermoelectric generator using said warm thermal source and said cold thermal source to produce electricity which is provided to said electrolytic cell.

4. The device according to claim 1, wherein the solar collectors are flat.

5. The device according to claim 2, wherein the solar collectors are flat.

6. The device according to claim 3, wherein the solar collectors are flat.

7. The device according to claim 2, wherein the device is configured to utilize low solar energy.

8. The device according to claim 2, wherein the device is configured to utilize low solar energy.

9. The device according to claim 3, wherein the device is configured to utilize low solar energy.

10. The device according to claim 1, wherein the solar collectors are fixed.

11. The device according to claim 2, wherein the solar collectors are fixed.

12. The device according to claim 3, wherein the solar collectors are fixed.

13. The device according to claim 1, wherein the warm fluid is water and the cold fluid is water containing glycol or ethylene glycol.

14. The device according to claim 3, wherein the warm fluid is water and the cold fluid is water containing glycol or ethylene glycol.

15. The device according to claim 3, wherein the warm fluid is water and the cold fluid is water containing glycol or ethylene glycol.

16. The device according to claim 1, wherein each solar collector is formed from a first black plastic film that serves as a base, a second black plastic film welded to the first black plastic film in order to create channels, and a transparent film welded to the base so as to create a volume that can be inflated and deflated.

17. The device according to claim 2, wherein each solar collector is formed from a first black plastic film that serves as a base, a second black plastic film welded to the first black plastic film in order to create channels, and a transparent film welded to the base so as to create a volume that can be inflated and deflated.

18. The device according to claim 3, wherein each solar collector is formed from a first black plastic film that serves as a base, a second black plastic film welded to the first black plastic film in order to create channels, and a transparent film welded to the base so as to create a volume that can be inflated and deflated.

* * * * *